(12) United States Patent
Liu (10) Patent No.: US 10,126,720 B2
(45) Date of Patent: Nov. 13, 2018

(54) INTELLIGENCE COMPUTER DESK AND CHAIR SYSTEM

(71) Applicant: Creating Nano Technologies, Inc., Tainan (TW)

(72) Inventor: Yu-Fing Liu, Tainan (TW)

(73) Assignee: Creating Nano Technologies, Inc., Tainan (TW)

(*) Notice: Subject to any disclaimer, the term of this patent is extended or adjusted under 35 U.S.C. 154(b) by 539 days.

(21) Appl. No.: 14/836,967

(22) Filed: Aug. 27, 2015

(65) Prior Publication Data

US 2016/0058186 A1 Mar. 3, 2016

(30) Foreign Application Priority Data

Aug. 29, 2014 (TW) ............... 103129879 A (51) Int. Cl.
*G05B 21/00* (2006.01)
*G01M 1/38* (2006.01)
*G05B 13/00* (2006.01)
*G05B 15/00* (2006.01)
*G05D 23/00* (2006.01)
*G05B 15/02* (2006.01)
*A47B 21/04* (2006.01)
*A47C 7/14* (2006.01)
*A47C 7/40* (2006.01)
(Continued)

(52) U.S. Cl.
CPC ............ *G05B 15/02* (2013.01); *A47B 21/02* (2013.01); *A47B 21/03* (2013.01); *A47B 21/04* (2013.01); *A47C 7/14* (2013.01); *A47C 7/402* (2013.01); *A47C 7/50* (2013.01); *F16M 11/00* (2013.01); *A47B 2083/025* (2013.01); *A47B 2200/0072* (2013.01)

(58) Field of Classification Search
CPC ... A47B 21/02; A47B 2200/0062; A47B 9/00; A47B 2083/025; A47B 21/03; A47B 21/04; A47B 2200/0072; G06Q 10/10; G06Q 10/109; A47C 7/14; A47C 7/402; A47C 7/50; F16M 11/00; G05B 15/02
See application file for complete search history.

(56) References Cited

U.S. PATENT DOCUMENTS 4,614,378 A * 9/1986 Picou ............... A47C 13/00
 297/118
5,251,961 A * 10/1993 Pass ............... A47C 9/005
 297/423.1
(Continued)

FOREIGN PATENT DOCUMENTS

CN 202154311 3/2012
CN 202698373 1/2013
(Continued)

OTHER PUBLICATIONS

"Office Action of Taiwan Counterpart Application," dated Oct. 20, 2015, p. 1-p. 7.

*Primary Examiner* — Thomas C Lee
*Assistant Examiner* — Zhipeng Wang
(74) *Attorney, Agent, or Firm* — JCIPRNET (57) ABSTRACT

An intelligence computer desk and chair system includes a platform, a carriage, and a control unit. The carriage is located on the platform. The control unit is electrically connected to the carriage. The control unit controls the carriage to move relative to the platform according to a built-in program.

12 Claims, 11 Drawing Sheets

(51) Int. Cl.
  *A47C 7/50*   (2006.01)
  *A47B 21/02*  (2006.01)
  *A47B 21/03*  (2006.01)
  *F16M 11/00*  (2006.01)
  *A47B 83/02*  (2006.01)

(56) References Cited

U.S. PATENT DOCUMENTS

| | | | | |
|---|---|---|---|---|
| 5,988,738 | A * | 11/1999 | Blessing | A47B 3/14 297/141 |
| 8,920,292 | B1 * | 12/2014 | Myers | A63B 22/0605 482/57 |
| 2001/0015567 | A1 * | 8/2001 | Tholkes | A47B 9/00 297/172 |
| 2004/0211343 | A1 * | 10/2004 | Song | A47B 21/00 108/50.01 |
| 2005/0275322 | A1 * | 12/2005 | Mosel | A47B 9/20 312/312 |
| 2006/0097557 | A1 * | 5/2006 | Tholkes | A61G 5/14 297/330 |
| 2007/0063569 | A1 * | 3/2007 | Mays | A47C 9/005 297/423.12 |
| 2007/0252919 | A1 * | 11/2007 | McGreevy | F16M 11/10 348/825 |
| 2009/0133609 | A1 * | 5/2009 | Nethken | A47B 21/02 108/50.02 |
| 2011/0109134 | A1 * | 5/2011 | Filipour | A47C 7/72 297/217.4 |
| 2011/0140484 | A1 * | 6/2011 | Chang | A47C 9/002 297/118 |
| 2014/0137773 | A1 * | 5/2014 | Mandel | G06Q 10/109 108/50.11 |
| 2014/0208986 | A1 * | 7/2014 | DesRoches | A47B 9/20 108/22 |
| 2016/0213140 | A1 * | 7/2016 | Koch | A47C 3/20 |
| 2017/0136919 | A1 * | 5/2017 | Deppe | B60N 2/0284 |

FOREIGN PATENT DOCUMENTS

| | | |
|---|---|---|
| CN | 103859852 | 6/2014 |
| JP | 2007143663 | 6/2007 |
| KR | 20090123394 | 12/2009 |
| TW | 201216895 | 5/2012 |

* cited by examiner

INTELLIGENCE COMPUTER DESK AND CHAIR SYSTEM

CROSS-REFERENCE TO RELATED APPLICATION

This application claims the priority benefit of Taiwan application serial no. 103129879, filed on Aug. 29, 2014. The entirety of the above-mentioned patent application is hereby incorporated by reference herein and made a part of this specification.

Field of the Disclosure

The disclosure relates to a computer desk and chair system; more particularly, the disclosure relates to an intelligence computer desk and chair system.

Description of Related Art

In modern society, the computer system has become an infatuation processing tool indispensable to the public. For instance, a desktop personal computer is often arranged on a computer desk; during the operation of the desktop personal computer, a user mostly sits on a chair at the desk for a long period of time, which is likely to cause shoulder, neck, or hips tensions and pain.

The normal computer desk complying with ergonomic requirements has the adjustable height, so as to allow the users to work in a standing position after the height of the desk is increased. Thereby, the shoulder, neck, or hips tensions and pain caused by maintaining the same posture (e.g., the standing posture) for a long period of time can be better released. Nevertheless, the height of the existing computer desk complying with ergonomic requirements is often manually adjusted by the user and can only be adjusted in one single direction, which is rather inconvenient and inflexible for the user.

SUMMARY

The disclosure is directed to an intelligence computer desk and chair system equipped with a control unit that can timely send a control signal according to a built-in program, such that a relative position of a carriage and a user can be controlled according to the control signal. Alternatively, an image sensing unit of the system can be applied to detect the instant posture of the user and automatically adjust the relative position between the user and the computer desk and chair.

In an embodiment of the disclosure, an intelligence computer desk and chair system that includes a platform, a carriage, and a control unit is provided. The carriage is located on the platform. The control unit is electrically connected to the carriage. The control unit controls the carriage to move relative to the platform according to a built-in program.

According to an embodiment of the disclosure, the built-in program of the control unit sends a movement signal at a predetermined time when a work mode is activated, such that the carriage moves relative to the platform.

According to an embodiment of the disclosure, the intelligence computer desk and chair system is suitable for a user to use. The intelligence computer desk and chair system further includes at least one image sensing device. The least one image sensing device is located on the carriage and electrically connected to the control unit. The at least one image sensing device is suitable for detecting variations in postures of the user to obtain image information and transmitting the image information to the control unit, and the control unit controls the carriage to move relative to the platform according to the image information.

According to an embodiment of the disclosure, the carriage includes a first transmission mechanism. The first transmission mechanism is suitable for being controlled by the control unit to ascend or descend along a first axial direction.

According to an embodiment of the disclosure, the carriage further includes a second transmission mechanism. The second transmission mechanism is movably arranged on the platform. The first transmission mechanism is arranged on the second transmission mechanism, and the second transmission mechanism is located between the platform and the first transmission mechanism. The second transmission mechanism is suitable for being controlled by the control unit to move along a second axial direction.

According to an embodiment of the disclosure, the carriage further includes a support frame and a rotating mechanism. The rotating mechanism is pivoted between the first transmission mechanism and the support frame. The rotating mechanism is suitable for being controlled by the control unit to rotate along an axis.

According to an embodiment of the disclosure, the at least one image sensing device is arranged on the support frame.

According to an embodiment of the disclosure, the second transmission mechanism is suitable for being controlled by the control unit to move along a third axial direction, and the first, second, and third axial directions are perpendicular to one another.

According to an embodiment of the disclosure, the second transmission mechanism is suitable for being controlled by the control unit to move relative to the platform along an axis.

According to an embodiment of the disclosure, the intelligence computer desk and chair system further includes a chair and a wireless transceiver. The chair is located on one side of the platform. The wireless transceiver is arranged on the chair. The control unit controls the chair to ascend or descend along a first axial direction through the wireless transceiver.

According to an embodiment of the disclosure, the chair includes a seat cushion and an extension pad. The extension pad is movably arranged on the seat cushion. The control unit controls the extension pad to move toward the user.

According to an embodiment of the disclosure, the chair includes a support pad, a back pad, and a movable seat cushion. The back pad is connected to the support pad. The movable seat cushion is pivoted to the back pad. When the user is in a standing posture, the movable seat cushion is located on a side of the back pad to expose the support pad and support the user. When the user is in a sitting posture, the movable seat cushion is rotated relative to the back pad along an axis, so as to cover the support pad for the user to sit.

According to an embodiment of the disclosure, the chair includes a seat cushion, a first foot pedestal, a second foot pedestal, a third foot pedestal, and a back pad. The first foot pedestal is connected to the seat cushion. The second foot pedestal is connected to the first foot pedestal. The third foot pedestal is slidably arranged on the second foot pedestal. The back pad is connected to the third foot pedestal. The third foot pedestal is suitable for moving relative to the second foot pedestal and rotating relative to the first foot pedestal, so as to adjust a relative position between the seat cushion and the back pad for the user to simultaneously lean against the seat cushion and the back pad.

According to an embodiment of the disclosure, the chair includes a seat cushion, a foot pedestal, and a pedaling mechanism. The foot pedestal is connected to the seat cushion. The pedaling mechanism is connected to the foot pedestal for the user to perform pedaling actions.

According to an embodiment of the disclosure, the chair includes a seat cushion, a back pad, and a pulling and stretching mechanism. The back pad is connected to the seat cushion. The pulling and stretching mechanism is arranged on the back pad and suitable for moving back and forth relative to the back pad.

In view of the above, the intelligence computer desk and chair system provided herein has the control unit that can timely send the control signal according to the built-in program. When the time frame during which the user uses the intelligence computer desk and chair system exceeds a predetermined time frame, the control unit controls the carriage to move relative to the platform according to the control signal, so as to assist the user in changing the posture while he or she is working without preventing the user from continuously working. Thereby, the user is able to work and exercise at the same time.

Additionally, the intelligence computer desk and chair system is also capable of detecting the instant variations in the user's posture and transmitting the instant image information to the control unit, such that the control unit is able to control the carriage to move relative to the platform according to the instant image information and further automatically adjust the relative position between the user and the carriage; thereby, the user can use the intelligence computer desk and chair system in a convenient and flexible manner.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Reference will now be made in detail to the present embodiments of the disclosure, examples of which are illustrated in the accompanying drawings. Wherever possible, the same reference numbers are used in the drawings and the description to refer to the same or like parts.

Figure 1:
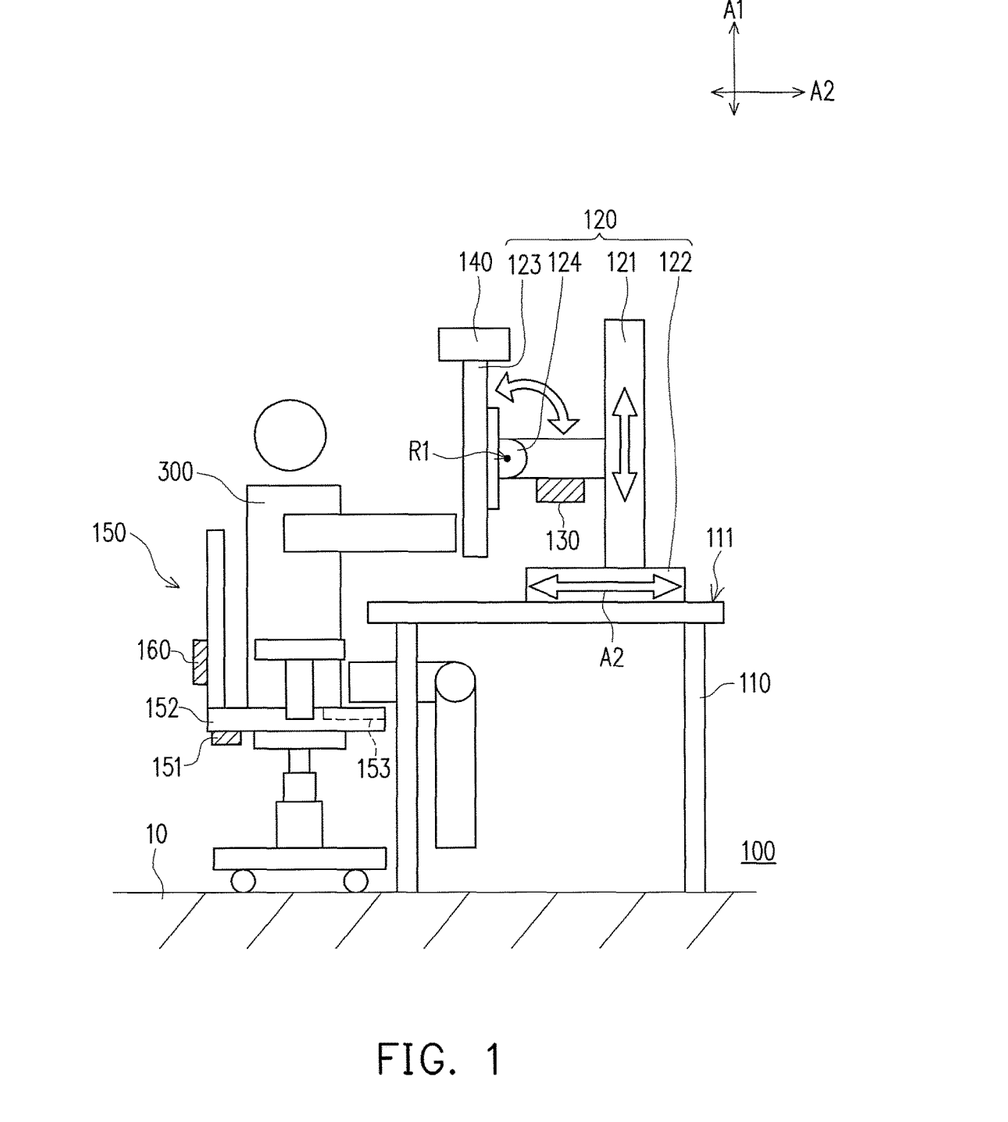
FIG. 1 is a side view of an intelligence computer desk and chair system according to an embodiment of the disclosure.
Figure 2:
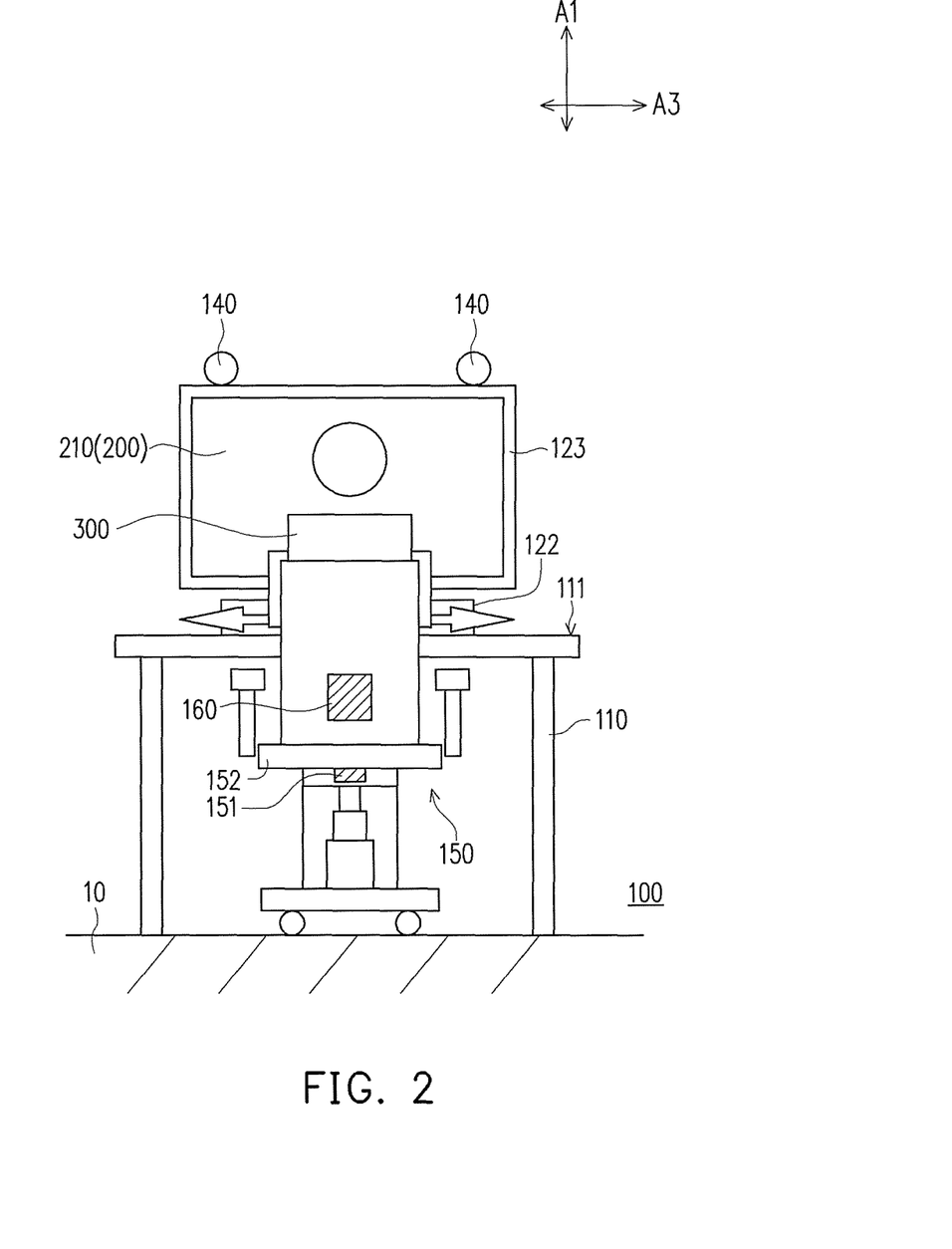
FIG. 2 is a front view of the intelligence computer desk and chair system depicted in FIG. 1.

FIG. 1 is a side view of an intelligence computer desk and chair system according to an embodiment of the disclosure. FIG. 2 is a front view of the intelligence computer desk and chair system depicted in FIG. 1. With reference to FIG. 1 and FIG. 2, in the present embodiment, an intelligence computer desk and chair system 100 includes a platform 110, a carriage 120, and a control unit 130.

Here, the platform 110 is a processing platform of a user while a work mode is activated, and the platform is a computer desk, for instance. The distance between the desktop 111 and the ground 10 can be fixed or adjustable, which should not be construed as a limitation in the disclosure. The carriage 120 is a device for supporting an electronic apparatus 200, for instance, and the carriage 120 is arranged on the platform 110. For instance, the electronic apparatus 200 may include a display 210 and an operating unit (not shown, e.g., a keyboard or a mouse) arranged on the desktop 111. Certainly, the display 210 can also be a touch panel. As shown in FIG. 1 and FIG. 2, the display 210 is located above the platform 110 through the carriage 120, such that the user is allowed to perform actions or view the display 210 while the work mode is being activated. However, the disclosure is not limited thereto, and the electronic apparatus 200 may be a tablet PC or other types of electronic products, e.g., a television, a surveillance device, and so on.

The control unit 130 is electrically connected to the carriage 120. In the present embodiment, the control unit 130 is arranged on the carriage 120, for instance; however, in other embodiments of the disclosure, the control unit 130 may also be arranged on the platform 111, which should however not be construed as a limitation in the disclosure. The control unit 130 has a built-in program. When the user 300 is located in front of the intelligence computer desk and chair system 100, and the work mode is activated, the control unit 130 sends a movement signal at a predetermined time (e.g., 30 minutes or 40 minutes after the work mode is activated or at any default timing set by user) and make the carriage 120 to move relative to the platform 110. Specifically, for instance, after the work mode is being activated for 30 minutes, the carriage 120 ascends relative to the platform 110 to a location where the user 300 is able to operate the electronic apparatus 200 while he or she is in a standing posture, so as to remind the user 300 of standing up after a long period of work time and assist the user 300 in standing up. At this time, the user 300 can work in the standing posture and also enhance the support strength of his or her thighs and legs.

After assisting the user 300 in working in the standing posture, and as another predetermined time goes by (e.g., 20 minutes after the standing mode is activated or at any default timing set by user), the control unit 130 may further control the carriage 120 to descend to the original sitting posture in which the user 300 is able to operate the electronic apparatus 200 according to other signals of the built-in program or may initiate another built-in program (e.g., a Taijiquan sport mode, a breathing exercise mode, a rehabilitation mode, and any other sport mode) to control the carrier 120 to move to the location required by these modes. The disclosure should not be limited to the embodiments provided herein.

Besides, the intelligence computer desk and chair system 100 may further include at least one image sensing device 140. Here, two image sensing devices 140 are provided in the present embodiment, for instance. The image sensing devices 140 are, for instance, photosensitive coupling devices, i.e., charge-coupled devices (CCDs) for sensing light and converting images into signals. Here, the two image sensing devices 140 are respectively arranged on two sides of the carriage 120; however, in other embodiments of the disclosure, the location and the number of the image sensing devices 140 may be adjusted according to actual design requirements and should not be construed as limitations in the disclosure.

The image sensing devices 140 are electrically connected to the control unit 130; therefore, when the image sensing devices 140 detect variations in the posture of the user 300 to obtain the instant image information and transmit the instant image information to the control unit 130, the control unit 130 is able to control the carriage 120 to move relative to the platform 110 according to a control signal generated by the image information, so as to automatically adjust the relative position between the display 210 and the user 300.

Particularly, the intelligence computer desk and chair system 100 further includes a wireless transceiver 160. The chair 150 is located on one side of the platform 110, such that the user 300 may sit on the chair 150 to watch or operate the electronic apparatus 200. The wireless transceiver 160 is arranged on the chair 150. The control unit 130 is able to send wireless signals to the wireless transceiver 160 according to the image information, so as to control the chair 150 to ascend or descend along a first axial direction A1 through the wireless transceiver 160. The ascending and descending movements of the chair 150 also contribute to the automatic adjustment of the relative position between the electronic apparatus 200 and the user 300.

In another aspect, the carriage 120 may include a first transmission mechanism 121, and the control unit 130 may generate the control signal according to the image information and thereby control the first transmission mechanism 121 to ascend or descend along the first axial direction A1. That is, when the user 300 is sitting on the chair 150, the relative position between the user 300 and the electronic apparatus 200 may be inappropriate for the user to watch or operate the electronic apparatus 200; if said issue persists, the user 300 who operates or watch the electronic apparatus 200 for a long period of time may suffer discomfort. Accordingly, in the present embodiment, after the user 300 sits on the chair 150, the image sensing devices 140 may detect the posture of the user operating or watching the electronic apparatus 200 to obtain the instant image information and transmit the instant image information to the control unit 130.

The control unit 130 may generate the control signal according to the image information, so as to control the first transmission mechanism 121 or the chair 150 to properly ascend or descend along the first axial direction A1, whereby the user 300 is able to operate or watch the electronic apparatus 200 in a comfortable posture (e.g., in compliance with the ergonomic requirements), i.e., prevent the bodily discomfort of the user 300. The ascending or descending actions of the first transmission mechanism 121 may be performed together with the ascending or descending actions of the chair 150 or may be independently performed from the ascending or descending actions of the chair 150, and such actions can be performed under the automatic control, which improves the efficiency and facilitates the use of the electronic apparatus 200.

With reference to FIG. 1 and FIG. 2, in the present embodiment, the carriage 120 further includes a second transmission mechanism 122. The second transmission mechanism 122 is movably arranged on the platform 110. The first transmission mechanism 121 is arranged on the second transmission mechanism 122, and the second transmission mechanism 122 is located between the platform 110 and the first transmission mechanism 121. The second transmission mechanism 122 is suitable for being controlled by the control unit 130 to move along a second axial direction A2, and the second axial direction A2 is perpendicular to the first axial direction A1. In other words, after the user 300 sits on the chair 150, the image sensing devices 140 may detect the posture of the user operating or watching the electronic apparatus 200 to obtain the instant image information and transmit the instant image information to the control unit 130. The control unit 130 may generate the control signal according to the image information, so as to control the second transmission mechanism 122 to properly move along the second axial direction A2, whereby the user 300 is able to operate or watch the electronic apparatus 200 in a comfortable posture or at a favorable distance, i.e., prevent the bodily discomfort of the user 300 and comply with the ergonomic requirements.

In the present embodiment, the carriage 120 further includes a support frame 123 and a rotating mechanism 124. The display 210 is arranged on the support frame 120, for instance, the image sensing devices 140 may be located on the support frame 123, and the rotating mechanism 124 is pivoted between the first transmission mechanism 121 and the support frame 124. Particularly, the rotating mechanism 124 is suitable for being controlled by the control unit 130 to rotate along a first axis R1. In other words, after the user 300 sits on the chair 150, the image sensing devices 140 may detect the posture of the user operating or watching the electronic apparatus 200 to obtain the instant image information and transmit the instant image information to the control unit 130. At this time, the control unit 130 may generate the control signal according to the image information and thereby control the rotating mechanism 124 to properly rotate along the first axis R1. Particularly, the angle at which the rotating mechanism 124 rotates along the first axis R1 is mainly determined according to the head-down or head-up position of the user 300, such that the user 300 is able to face the display 210 without discomforting his or her eyes.

On the other hand, the second transmission mechanism 122 is also suitable for being controlled by the control unit 130 to move along a third axial direction A3, and the first, second, and third axial directions A1, A2, and A3 are perpendicular to one another. That is, when the user 300 sits on the chair 150 to operate or watch the electronic apparatus 200, the user 300 may move left or right relative to the electronic apparatus 200 through the sliding action of the chair 150, i.e., the movement along the third axial direction A3. At this time, the image sensing devices 140 may detect the variations in the posture of the user 300 to obtain the instant image information and transmit the instant image information to the control unit 130. The control unit 130 can generate the control signal according to the image information and control the second transmission mechanism 122 to properly move along the third axial direction A3, such that the user 300 is allowed to face the display 210 without discomforting his or her eyes.

In brief, the second transmission mechanism 122 can move relative to the platform 110 along two different axial directions (i.e., the second axial direction A2 and the third axial direction A3), the entire carriage 120 is able to move along the two different axial directions (i.e., the second axial direction A2 and the third axial direction A3) through the movement of the second transmission mechanism 122.

Figure 3:
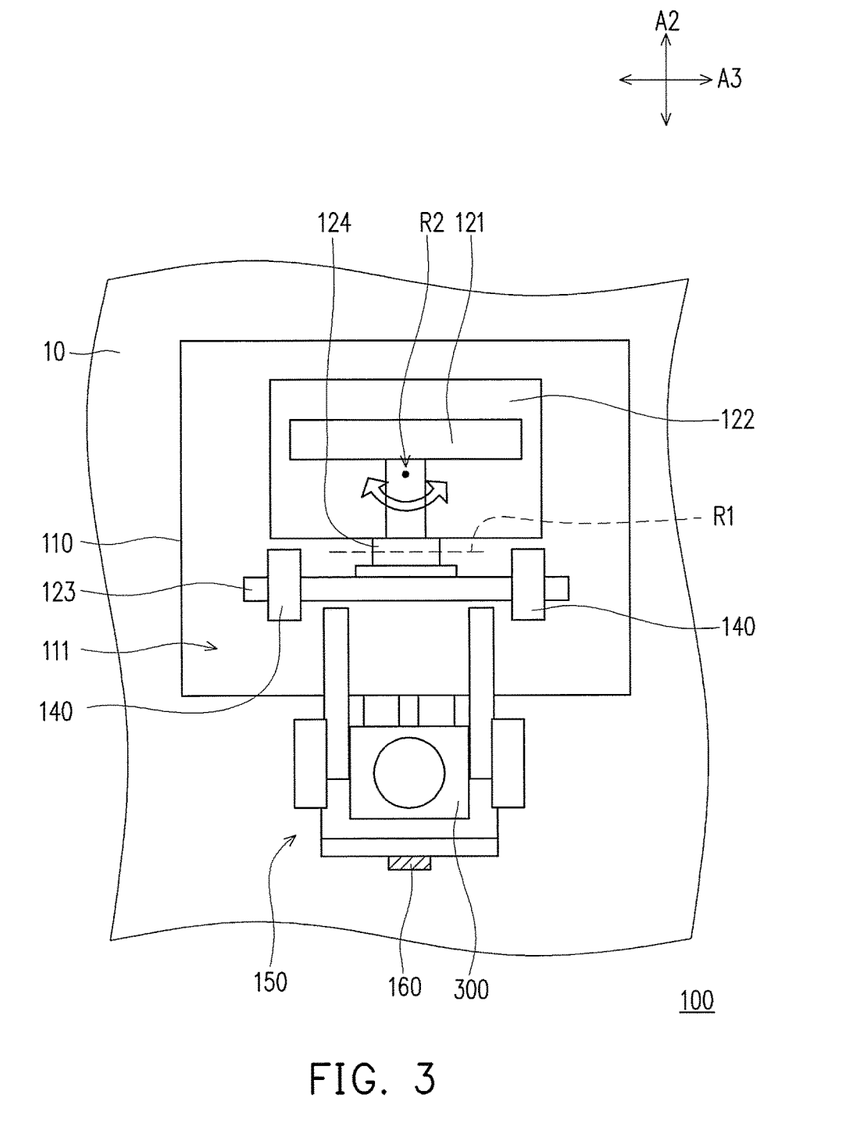
FIG. 3 is a top view of the intelligence computer desk and chair system depicted in FIG. 1 at another viewing angle.

FIG. 3 is a top view of the intelligence computer desk and chair system depicted in FIG. 1. With reference to FIG. 3, in the present embodiment, the second transmission mechanism 122 is suitable for being controlled by the control unit 130 to rotate relative to the platform 110 along a second axis R2. That is, when the user 300 sits on the chair 150 to operate or watch the electronic apparatus 200, the user 300 may rotate along the first axial direction A1 through the movement of the chair 150. At this time, the image sensing devices 140 may detect the variations in the posture of the user 300 to obtain the instant image information and transmit the instant image information to the control unit 130. The control unit 130 can generate the control signal according to the image information and control the second transmission mechanism 122 to properly rotate relative to the platform 110 along the second axis R2, such that the user 300 is allowed to face the display 210 without discomforting his or her eyes. Here, the second axis R2 is parallel to the first axial direction A2 and passes a centroid of the second transmission mechanism 122, for instance.

Specifically, the second transmission mechanism 122 not only can move relative to the platform 110 along two different axial directions (i.e., the second axial direction A2 and the third axial direction A3) but also can rotate relative to the platform 110 along the second axis R2; hence, the entire carriage 120 is able to move along the two different axial directions (i.e., the second axial direction A2 and the third axial direction A3) or rotate relative to the platform 110 along the second axis R2 through the movement of the second transmission mechanism 122. Namely, the carriage 120 can achieve the movement flexibility along three different axial directions (i.e., the first axial direction A1, the second axial direction A2, and the third axial direction A3) and the rotation flexibility along two different axes (i.e., the first axial direction R1 and the axis R2), so as to enhance the flexibility of using the intelligence computer desk and chair system 100.

Figure 4:
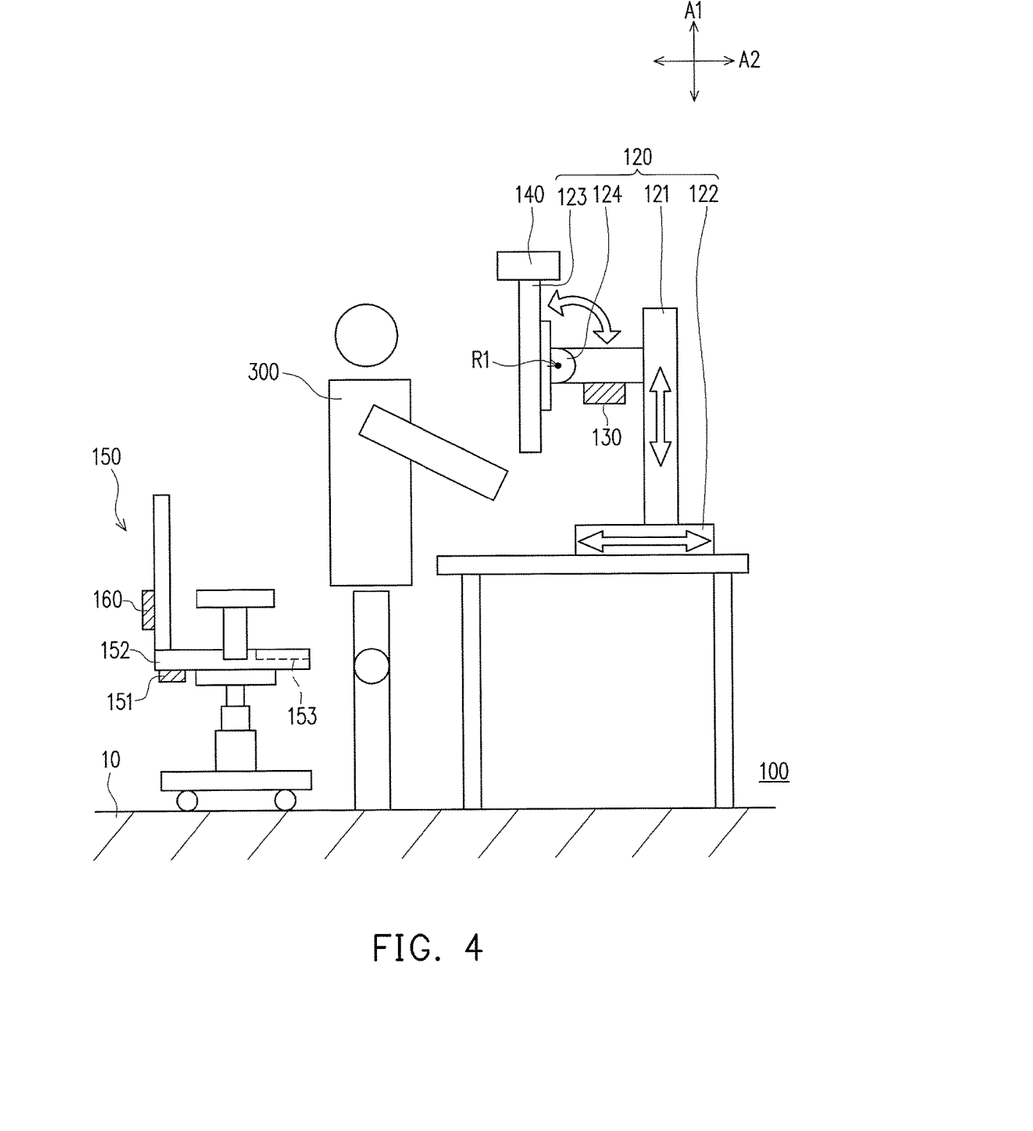
FIG. 4 is a side view illustrating the user standing at the intelligence computer desk and chair system depicted in FIG. 1.
Figure 5:
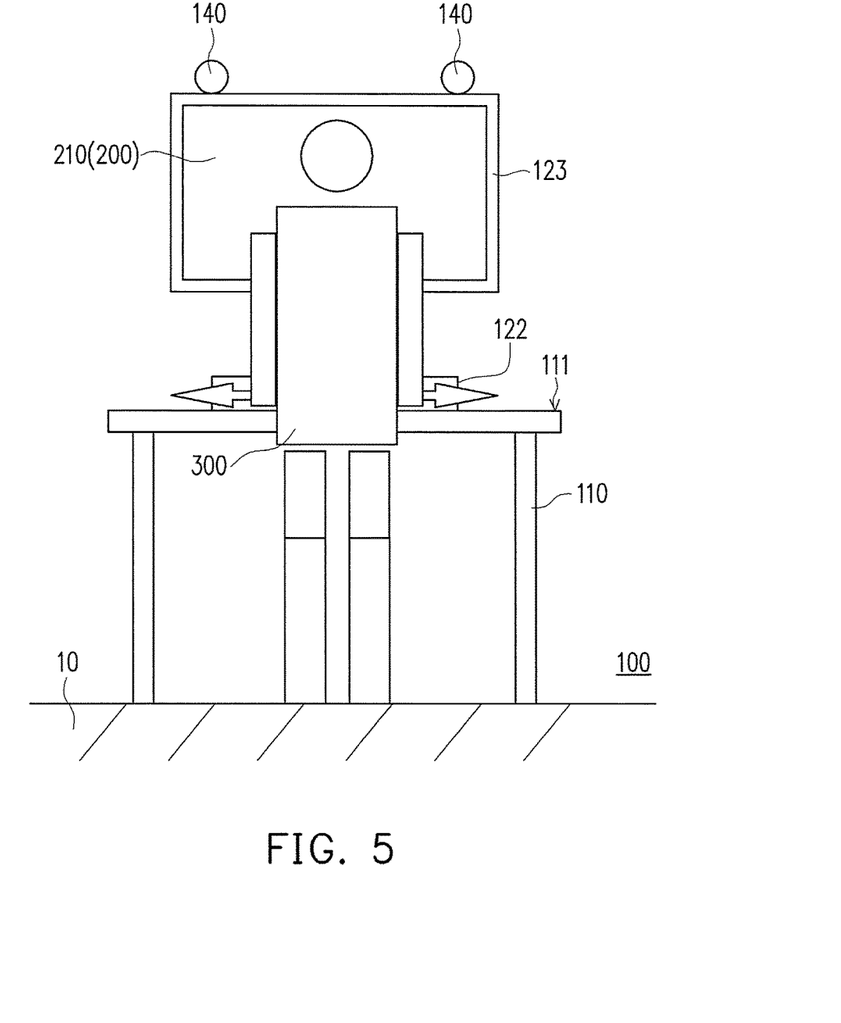
FIG. 5 is a front view of the intelligence computer desk and chair system depicted in FIG. 4.

The above embodiments are provided to elaborate that the image sensing devices 140 detect the variations in the posture of the user 300 and obtain the image information when the user 300 sits on the chair 150 as well as transmit the image information to the control unit 130. The control unit 130 generates the control signal according to the image information and controls the carriage 120 to move along three different axial directions (i.e., the first axial direction A1, the second axial direction A2, and the third axial direction A3) and rotate along two different axes (i.e., the first axis R1 and the second axis R2). FIG. 4 is a side view illustrating the user standing at the intelligence computer desk and chair system depicted in FIG. 1. FIG. 5 is a front view of the intelligence computer desk and chair system depicted in FIG. 4. The chair 150 is not illustrated in FIG. 5. With reference to FIG. 1, FIG. 4, and FIG. 5, after the user 300 sits and watch or operate the electronic apparatus 200 for a long period of time, the user 300 may feel hips, waist, back, and shoulder pain and discomfort because the user 300 continues to be in the same posture for a long time. At this time, the user 300 may stand up to operate or watch the electronic apparatus 200.

The variations in the posture of the user 300 (from the sitting posture to the standing posture) are significant, such that the user 300 is able to operate or watch the electronic apparatus 200 in a comfortable posture at a favorable distance, and that the user 300 is allowed to face the display 210 without any discomfort. The intelligence computer desk and chair system 100 can also control the carriage 120 through the control unit 130 according to the image information obtained by the image sensing devices 140 to move relative to the platform 110. Here, the movement of the carriage along three different axial directions (i.e., the first axial direction A1, the second axial direction A2, and the third axial direction A3) and the rotation of the carriage along two different axes (i.e., the first axis R1 and the second axis R2) can be deduced from the above descriptions and thus will not be further explained hereinafter.

The chair 150 can also be equipped with a sensor 150; as long as the user 300 sits on the chair 150 for a period of time that exceeds the predetermined time frame, the sensor 150 may send warning sound and vibrations to remind the user 300 of standing up or stretching. The carriage 120 can move in response to the variations in the posture of the user 300; hence, the user 300 is able to face the display 210 while standing up or stretching without any discomfort.

Figure 6:
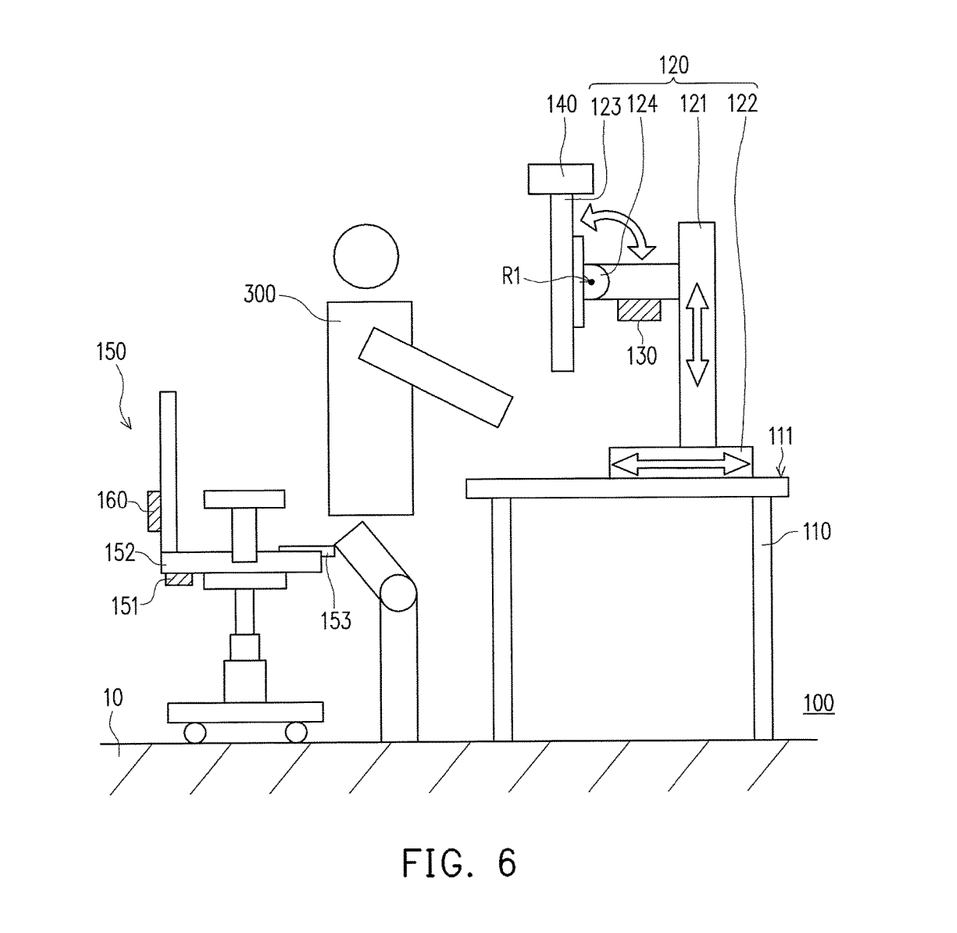
FIG. 6 is a side view illustrating the user who intends to sit on the chair of the intelligence computer desk and chair system depicted in FIG. 4.

FIG. 6 is a side view illustrating the user who intends to sit on the chair of the intelligence computer desk and chair system depicted in FIG. 4. With reference to FIG. 4 and FIG. 6, when the user 300 in the standing posture intends to be in the sitting posture again, the control unit 130 may control the chair 150 through the wireless transceiver 160 to ascend according to the image information obtained by the image sensing devices 140. Thereby, the difference in the height of the hips of the user 300 and the height of the chair 150 can be reduced. Besides, the chair 150 includes a seat cushion 152 and an extension pad 153 movably arranged on the seat cushion 152. Before the user 300 sits on the seat cushion 152, the control unit 130 may control the extension pad 153 through the wireless transceiver 160 to move toward the user 300, and the extension pad 153 may move along the first axial direction A1 or the second axial direction A2.

That is, before the user 300 sits on the seat cushion 152, the hips of the user 300 may first lean against the extension pad 153 as the cushion, and the user 300 may then stably sit on the seat cushion 152 after the extension pad 153 moves to retreat the seat cushion 152. Thereby, the user 300 in the standing posture can be prevented from falling on the ground 10 while he or she gradually sits down on the chair 150; moreover, said design also benefits the physically challenged user 300. The chair 150 may also have an operating button (not shown) which may assist in the physically challenged user 30 who intends to sit down on the chair 150 or stand up from the chair 150.

Figure 7:
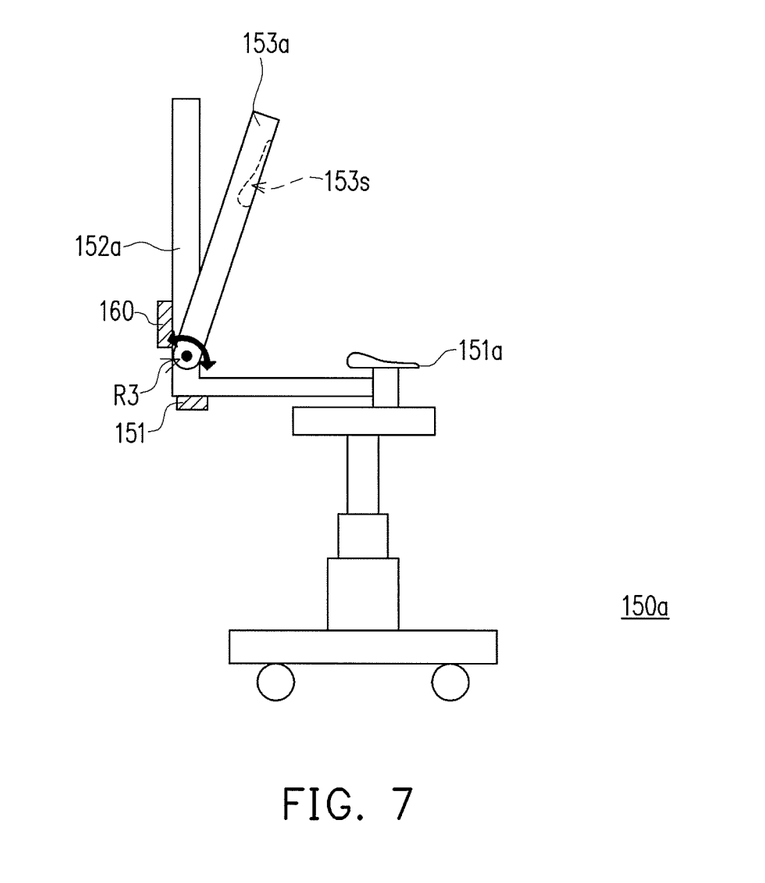
FIG. 7 is a side view of a chair according to another embodiment of the disclosure.

FIG. 7 is a side view of a chair according to another embodiment of the disclosure. Different from the chair 150 provided in the previous embodiments, the chair 150a depicted in FIG. 7 and provided in the present embodiment may include a support pad 151a, a back pad 152a, and a movable seat cushion 153a. The back pad 152a is connected to the support pad 151a which complies with the ergonomic requirements and is shaped as a bicycle saddle, for instance. When the user 300 is in the standing posture, the movable seat cushion 153a is located on a side of the back pad 152a to expose the support pad 151a and support the user 300. That is, the user 300 in the standing posture may slightly lean against the support pad 151a with his or her hips, so as to reduce the body weight exerted to his or her knees.

Thereby, thigh and leg muscles can be strengthened, and the impact exerted to the knees can be lessened.

When the user 300 is in a sitting posture or intends to return to the sitting posture from the standing posture, the movable seat cushion 153a can be rotated relative to the back pad 152a along a third axis R3, so as to cover the support pad 151a for the user 300 to sit. That is, the movable seat cushion 153a may have accommodation space 153a that may accommodate the support pad 151a. At this time, the user 300 may sit on the movable seat cushion 153a with his or her hips and lean his or her back against the back pad 152a, so as to increase the comfort of the user 300 in the sitting posture.

Figure 8:
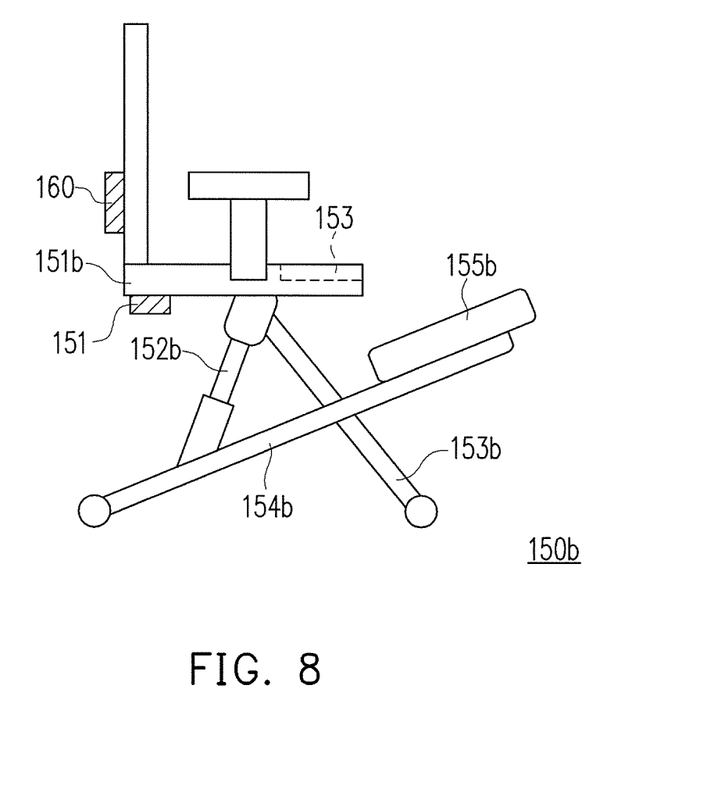
FIG. 8 is a side view of a chair according to yet another embodiment of the disclosure.

FIG. 8 is a side view of a chair according to yet another embodiment of the disclosure. Different from the chair 150 provided in the previous embodiments, the chair 150b depicted in FIG. 8 and provided in the present embodiment may include a seat cushion 151b, a first foot pedestal 152b, a second foot pedestal 153b, a third foot pedestal 154b, and a back pad 155b. The first foot pedestal 152b is connected to the seat cushion 151b, the second foot pedestal 153b is connected to the first foot pedestal 152b, and the third foot pedestal 154b is slidably connected to the second foot pedestal 153b. The back pad 155b is connected to the third foot pedestal 154b, and third foot pedestal 154b is suitable for moving relative to the second foot pedestal 153b and rotating relative to the first foot pedestal 152b, so as to adjust a relative position between the seat cushion 151b and the back pad 155b. That is, the height from the back pad 155b to the ground may be adjusted in response to the movement of the third foot pedestal 154b relative to the second foot pedestal 153b. In view of said structural design and operational principles, the user 300 is able to lean against the seat cushion 151b with his or her hips and lean against the back pad 155b with his or her legs (e.g., shanks), such that the user 300 appears to sit on his or her knees. As a result, the discomfort resulting from the sitting or standing actions for a long period of time can be released.

Figure 9:
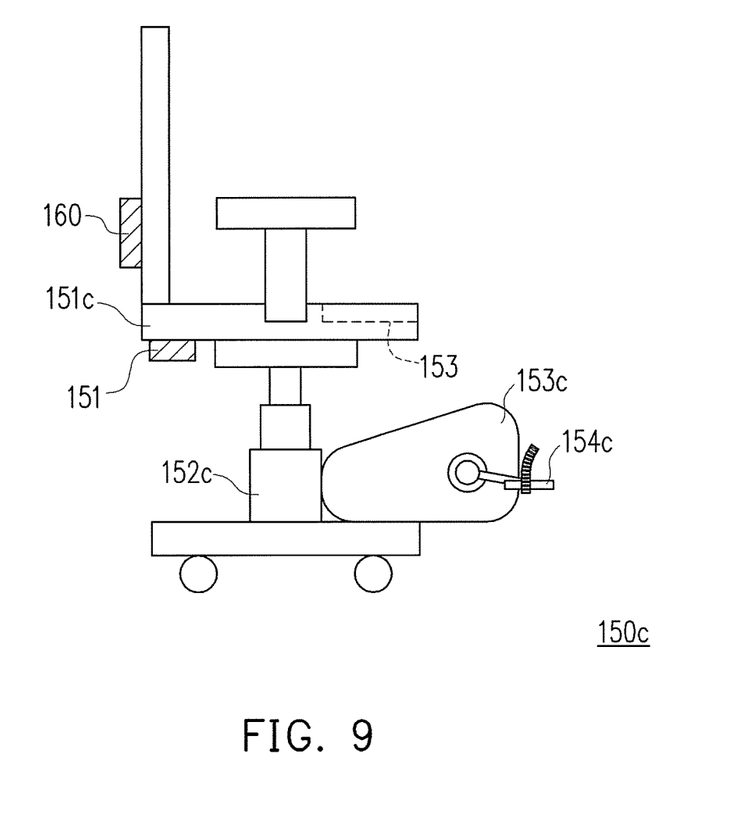
FIG. 9 is a side view of a chair according to yet another embodiment of the disclosure.

FIG. 9 is a side view of a chair according to yet another embodiment of the disclosure. Different from the chair 150 provided in the previous embodiments, the chair 150c depicted in FIG. 9 and provided in the present embodiment may include a seat cushion 151c, a foot pedestal 152c, and a pedaling mechanism 153c. The foot pedestal 152c is connected to the seat cushion 151c, and the pedaling mechanism 153c is connected to the foot pedestal 152c. The pedaling mechanism 153c has pedals 154c. Hence, when the user 300 sits on the seat cushion 151c, the user may put his or her soles of foot on the pedals 154c and perform pedaling actions through the pedaling mechanism 153c, such that the user 300 is able to work and exercise at the same time. For instance, the pedaling mechanism 153c may be any pedaling mechanism on a common stationary bike or a common spinning bike; hence, if the resistance provided by the pedaling actions performed by the user 300 is insufficient and does not provide any benefit, the resistance may be properly increased. On the contrary, if the resistance provided by the pedaling actions is excessive, the resistance may be properly decreased.

Figure 10:
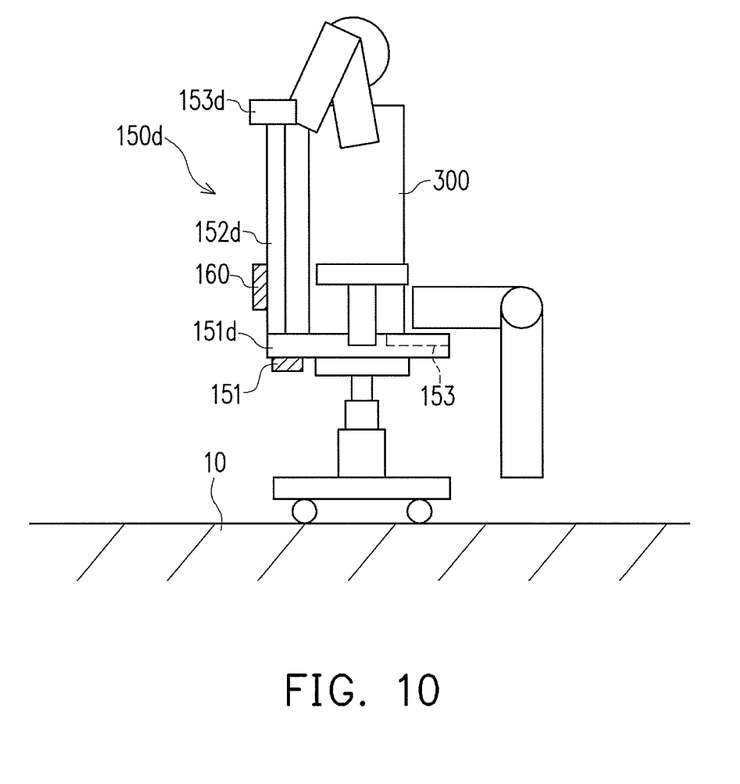
FIG. 10 and FIG. 11 are side views illustrating movement of a chair according to yet another embodiment of the disclosure.
Figure 11:
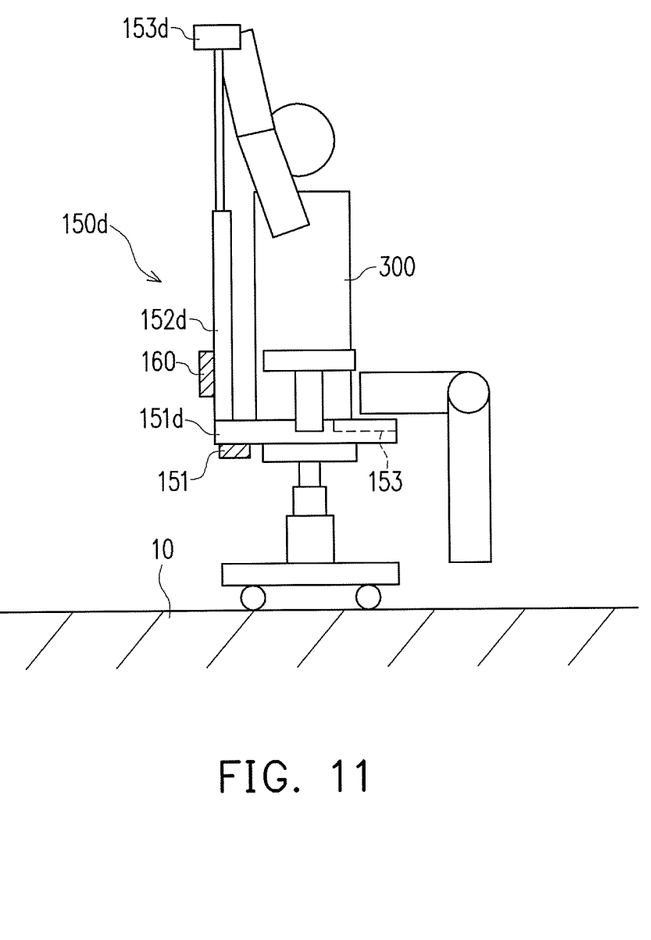

FIG. 10 and FIG. 11 are side views illustrating movement of a chair according to yet another embodiment of the disclosure. Different from the chair 150 provided in the previous embodiments, the chair 150d depicted in FIG. 10 and FIG. 11 and provided in the present embodiment may include a seat cushion 151d, a back pad 152d, and a pulling and stretching mechanism 153d. The back pad 152d is connected to the seat cushion 151d, and the pulling and stretching mechanism 153d is arranged on the back pad 152d and is suitable for moving back and forth relative to the back pad 152d. Particularly, after the user 300 has been sitting on the seat cushion 151d for a long period of time and maintains a certain position to operate or watch the electronic apparatus 200 (shown in FIG. 1), the user 300 is bound to feel fatigued and stiff. At this time, the user 300 may stretch out his or her hands toward the back pad 152d and grab the pulling and stretching mechanism 153d. The user 300 may then push the pulling and stretching mechanism 153d upwards, so as to stretch his or her hand, waist, and back muscles. For instance, the pulling and stretching mechanism 153d may be composed by elastic parts or may have an automatic mechanism-retreating design. Thereby, after the user 300 finishes stretching, a driving force may be exerted to move the pulling and stretching mechanism 153d back to the initial position shown in FIG. 10 for the next use. In other feasible embodiments, similar pulling and stretching mechanism 153d may be arranged on two sides of the seat cushion 151d for the user 300 to stretch his or her hand muscles.

To sum up, the intelligence computer desk and chair system provided herein has the control unit that can timely send the control signal according to the built-in program. When the time frame during which the user uses the intelligence computer desk and chair system exceeds a predetermined time frame, the control unit controls the carriage to move relative to the platform according to the control signal, so as to assist the user in changing the posture while he or she is working without preventing the user from continuously working. Thereby, the user is able to work and adjust his or her posture.

Besides, the intelligence computer desk and chair system may also detect the variations in the posture of the user through the image sensing device and transmit the obtained image information to the control unit. The control unit may then generate the control signal according to the image information and may thereby control the carriage to move relative to the platform along the first axial direction, the second axial direction, or the third axial direction and rotate relative to the platform along the first axis or the second axis. As such, the user is able to operate or watch the electronic apparatus in a comfortable posture or at a favorable distance, and can face the display of the electronic apparatus, i.e., prevent the bodily discomfort of the user. No matter whether the user is in motion or stationary, the operating mechanism of the carriage can be executed in response to the variations in the posture of the user; that is to say, the intelligence computer desk and chair system is able to detect the instant variations in the posture of the user and automatically adjust the best relative position between the user and the computer desk and chair. As a result, the user can use the intelligence computer desk and chair system in a convenient and flexible manner.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. An intelligence computer desk and chair system comprising:
   a platform;
   a carriage located on the platform, wherein the carriage comprises:

a first transmission mechanism configured to move upward or downward along a first axial direction;

a second transmission mechanism movably arranged on the platform and located between the platform and the first transmission mechanism, the first transmission mechanism being arranged on the second transmission mechanism, wherein the second transmission mechanism is configured to move along a second axial direction and a third axial direction, and the first, second, and third axial directions are perpendicular to one another; and a control unit electrically connected to the carriage, the carriage is configured to move relative to the platform according to a built-in program.

2. The intelligence computer desk and chair system of claim 1, wherein the built-in program of the control unit:
sends a movement signal at a predetermined time when a work mode is activated, such that the carriage moves relative to the platform.

3. The intelligence computer desk and chair system of claim 1, the intelligence computer desk and chair system being suitable for a user to use and further comprising:
at least one image sensing device located on the carriage and electrically connected to the control unit, the at least one image sensing device being suitable for detecting variations in postures of the user to obtain image information and transmitting the image information to the control unit, the carriage is configured to move relative to the platform according to the image information.

4. The intelligence computer desk and chair system of claim 1, wherein the carriage further comprises:
a support frame; and
a rotating mechanism pivoted between the first transmission mechanism and the support frame, wherein the rotating mechanism is configured to rotate along an axis.

5. The intelligence computer desk and chair system of claim 4, wherein at least one image sensing device is arranged on the support frame.

6. The intelligence computer desk and chair system of claim 1, wherein the second transmission mechanism is configured to move relative to the platform along an axis.

7. The intelligence computer desk and chair system of claim 1, further comprising:
a chair located on one side of the platform for a user to use; and
a wireless transceiver arranged on the chair, the chair is configured to move upward or downward along a first axial direction through the wireless transceiver.

8. The intelligence computer desk and chair system of claim 7, wherein the chair comprises:
a seat cushion; and
an extension pad movably arranged on the seat cushion, the extension pad is configured to move toward the user through the wireless transceiver.

9. An intelligence computer desk and chair system comprising:

a platform;
a carriage located on the platform;
a control unit electrically connected to the carriage, the carriage is configured to move relative to the platform according to a built-in program;
a chair located on one side of the platform for a user to use, wherein the chair comprises:
a support pad;
a back pad connected to the support pad; and
a movable seat cushion pivoted to the back pad, when the user is in a standing posture, the movable seat cushion being located on a side of the back pad to expose the support pad and support the user, when the user is in a sitting posture, the movable seat cushion being rotated relative to the back pad along an axis, so as to cover the support pad for the user to sit; and
a wireless transceiver arranged on the chair, the chair is configured to move upward or downward along a first axial direction through the wireless transceiver.

10. An intelligence computer desk and chair system comprising:
a platform;
a carriage located on the platform;
a control unit electrically connected to the carriage, the carriage is configured to move relative to the platform according to a built-in program;
a chair located on one side of the platform for a user to use, wherein the chair comprises:
a seat cushion;
a first foot pedestal connected to the seat cushion;
a second foot pedestal connected to the first foot pedestal;
a third foot pedestal slidably arranged on the second foot pedestal; and
a back pad connected to the third foot pedestal, the third foot pedestal being suitable for moving relative to the second foot pedestal and rotating relative to the first foot pedestal, so as to adjust a relative position between the seat cushion and the back pad for the user to simultaneously lean against the seat cushion and the back pad; and
a wireless transceiver arranged on the chair, the chair is configured to move upward or downward along a first axial direction through the wireless transceiver.

11. The intelligence computer desk and chair system of claim 7, wherein the chair comprises:
a seat cushion;
a foot pedestal connected to the seat cushion; and
a pedaling mechanism connected to the foot pedestal for the user to perform pedaling actions.

12. The intelligence computer desk and chair system of claim 7, wherein the chair comprises:
a seat cushion;
a back pad connected to the seat cushion; and
a pulling and stretching mechanism arranged on the back pad, the pulling and stretching mechanism is configured to move forward or backward relative to the back pad.

* * * * *